Feb. 11, 1969　　　C. L. DELLINGER　　　3,427,081
BEARING ASSEMBLY

Filed July 10, 1967　　　　　　　　　　Sheet 1 of 5

INVENTOR.
CARL L. DELLINGER
BY
JOHN P. CHANDLER
HIS ATTORNEY.

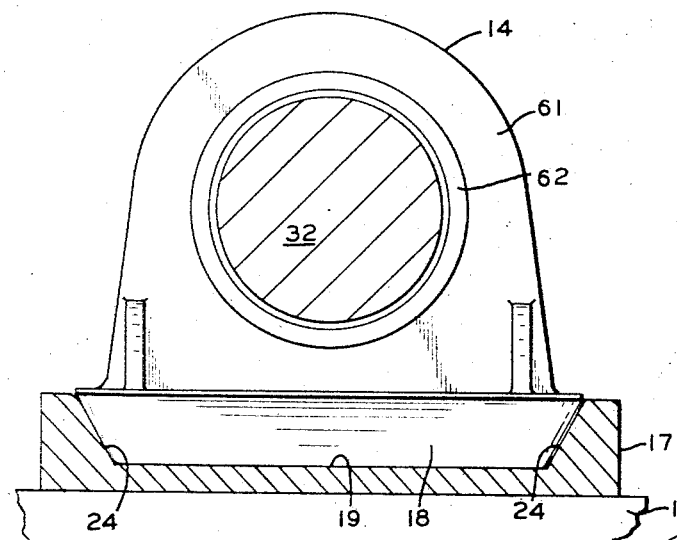
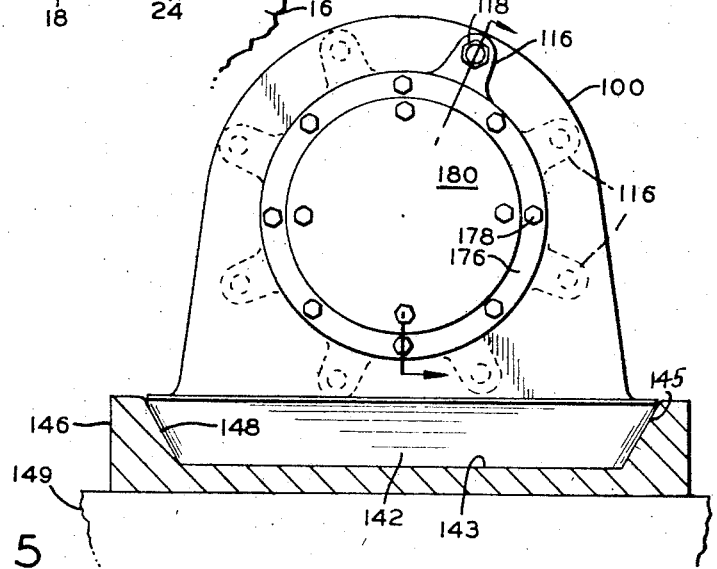
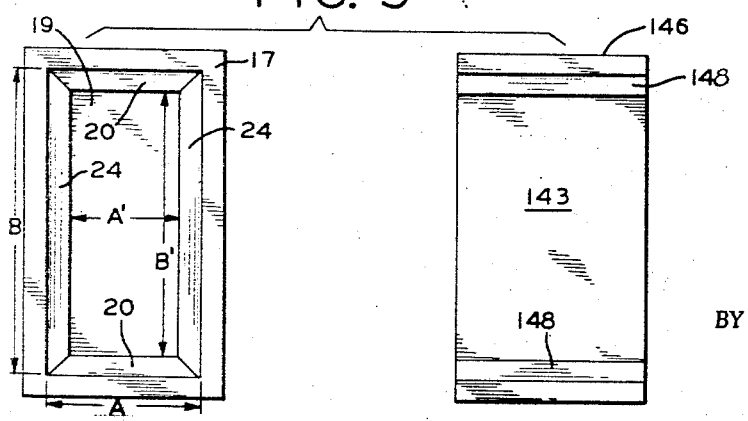

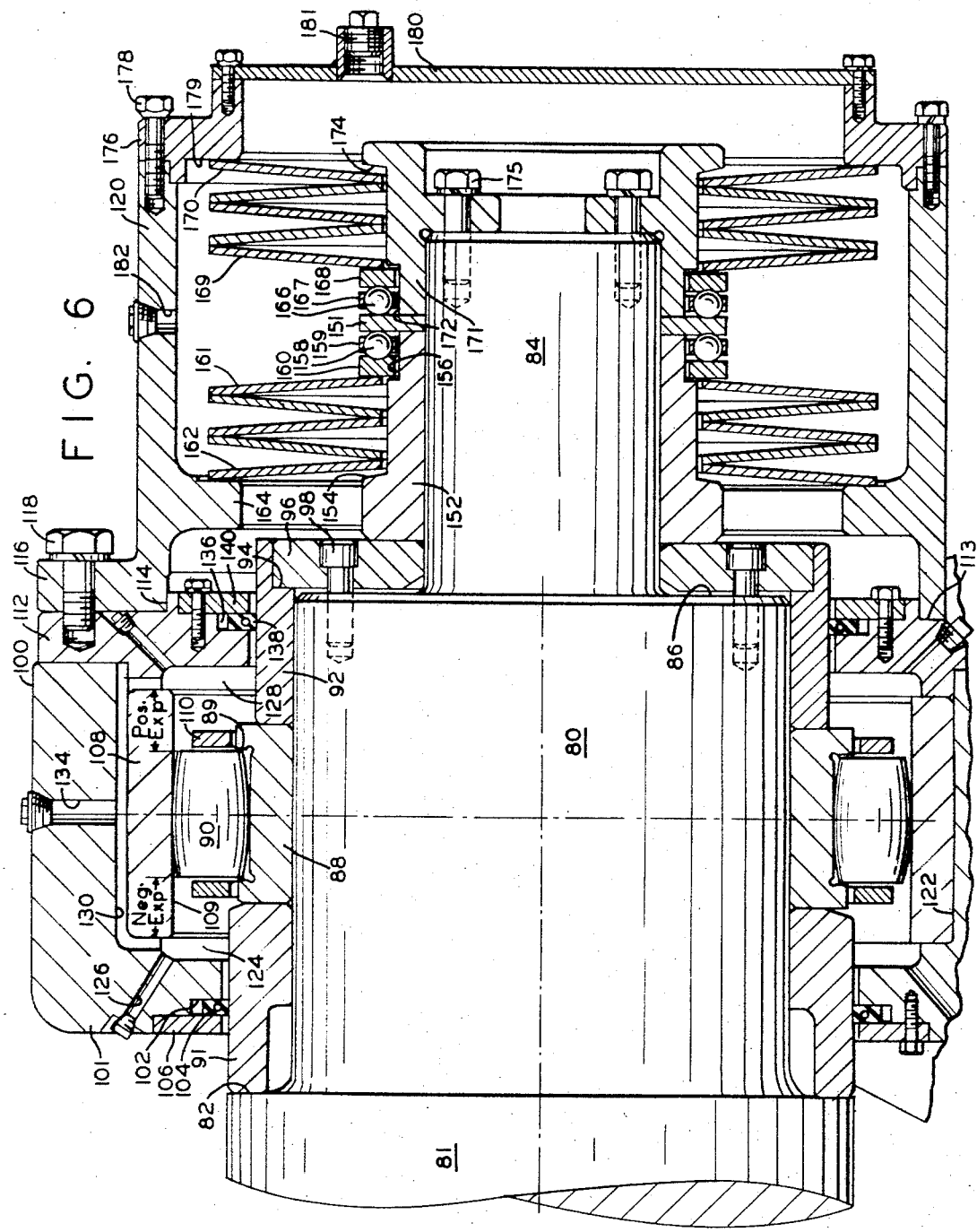

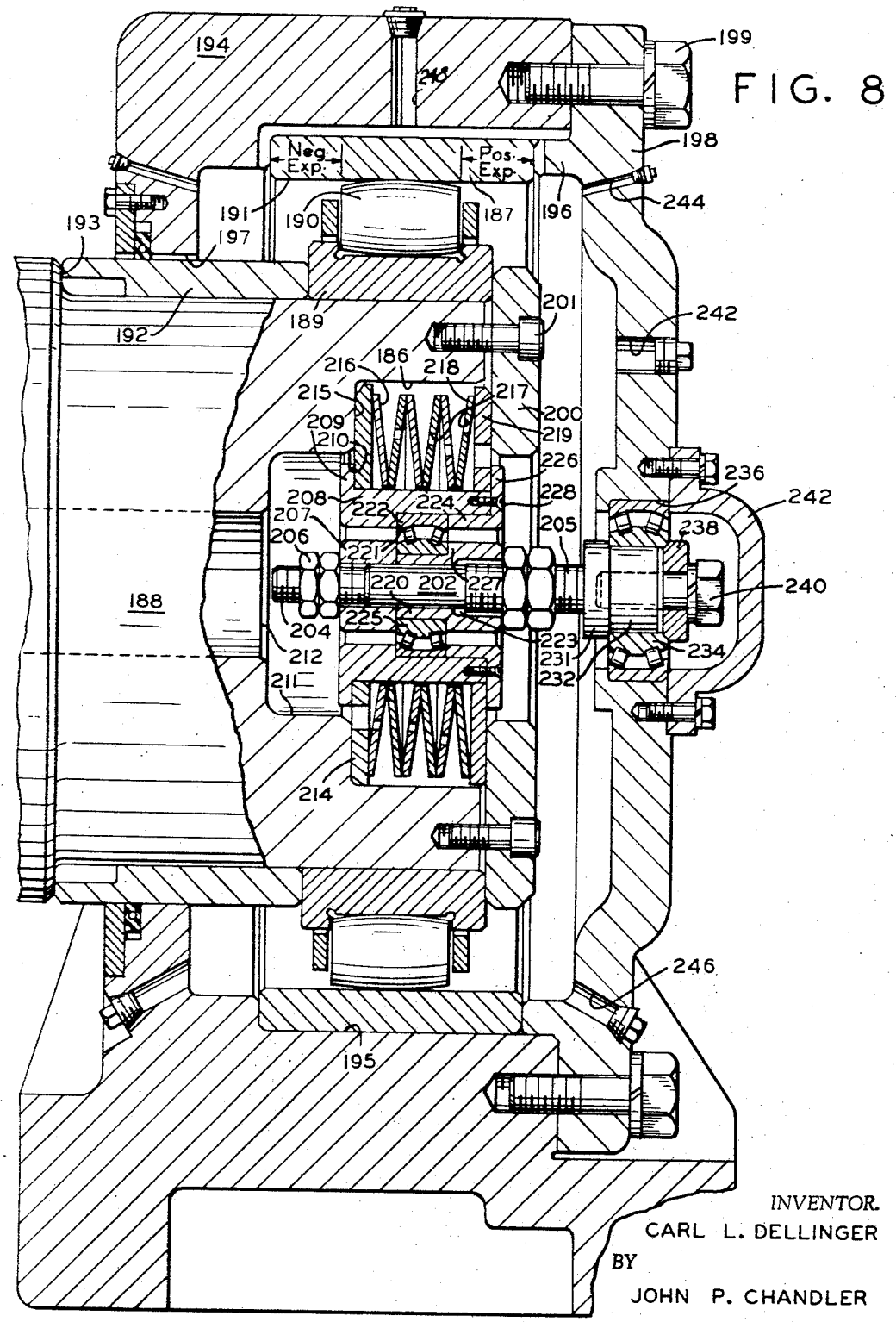

United States Patent Office 3,427,081
Patented Feb. 11, 1969

3,427,081
BEARING ASSEMBLY
Carl L. Dellinger, Norwalk, Conn., assignor to Universal American Corporation, New York, N.Y., a corporation of Delaware
Filed July 10, 1967, Ser. No. 652,065
U.S. Cl. 308—15                  16 Claims
Int. Cl. F16c 13/00, 35/00, 39/00

ABSTRACT OF THE DISCLOSURE

A bearing assembly for a steel making vessel supported in a trunnion ring with aligned main shafts extending from opposite sides of the ring, a main bearing in which the shaft is journalled at both a fixed end and at an expansion end of the assembly, housing enclosing each main bearing, a pedestal with a base receptacle having a recess extending downwardly from its top, supporting each housing, a base section with matching inclined walls, to cause said housing, when raised from and later returned to the base receptacle, to be returned in its initial position.

---

This invention relates to an improved bearing assembly for basic oxygen furnaces, wherein the bearings are at all times subjected to heavy radial loads with slow and infrequent periods of rotation, as well as shock loads of considerable magnitude during charging and deskulling operation. The vessel and hence the bearings are subjected to a wide range of temperature and with the relatively large distance between bearings at each end of the trunnion supporting the vessel, the shaft at the expansion end can have as much as 1″ axial movement. There are also many factors producing misalignment such as static and dynamic deflection, and distortion due to heat. Also, bearings most suited to the broad purpose require frequent inspection and servicing.

The improved bearing assembly of the present invention includes a specially designed bearing at the drive end and at the expansion end, both enclosed in novel housings protecting the bearing parts against contamination due to dust blown into the atmosphere, spilled slag, and also having lubrication means capable of withstanding the operating temperature without deterioration and remain confined within the housing without excessive leakage or evaporation. Each of the housings are supported on a base receptacle atop a pedestal. The receptacles have recesses with inwardly inclined side walls which receive the base sections of the housings, which have matching contours and the distinct novelty resides in the fact that the entire assembly—housing, bearings, trunnion shafts, trunnion, and vessel—can be picked up and carried to a reclining or repair location. When returned to the base receptacle on the pedestals, the base sections of the bearing housing are quickly and effectively guided back into the starting positions and lowered accurately into place due to the matching inclined side walls which act as pilots. The base receptacle at the drive is double directional, i.e., this end has two pairs of inclined side walls which locate the bearing housing axially and transversely while the receptacle at the expansion end locates the housing only transversely, thus permitting a reasonable variation in position, upon being returned.

One of the difficulties heretofore experienced in bearings of this character is how to resolve the axial expansion and contraction of the shaft and the problem was intensified when it appeared to be desirable to lift the entire assembly—vessel, bearings and bearing housings from its working location, usually when axial expansion has taken place due to the intensive heat—and transport it to a repair location and later return it, usually at a much lower temperature, to working position.

To cope with this axial expansion and contraction of the main shaft, the outer ring of the main expansion bearing is made longer than usual and the extensions of this long ring were, in effect, positive and negative expansion allowances. A plurality of stacks of spring washers in opposed relation and under some preload are disposed in a self-contained spring cartridge, carried with the housing and when the shaft is under expansion one stack is put under compression and the second stack is expanded. When the housing is lifted from the pedestal, one stack or the other returns the outer ring to its centered position with respect to the inner ring and roller assembly.

Thus, an important object of the invention was to provide a spring cartridge which was self-centering and self-squaring and which can be installed and removed without touching the main bearing and in a modified arrangement the two pairs of springs were combined into a single assembly and positioned in a bore in the main shaft. This arrangement like the first was self-centering and was also self-aligning but not self-squaring. Each arrangement had its special advantage.

In the drawing:

FIG. 4 is a base section taken on line 4—4 of FIG. 2;

FIG. 5 is a plan view of the base receptacles for the drive end and expansion end bearing housings and showing the recesses in each;

FIG. 6 is a central section taken through the bearing housing at expansion end of the assembly, the section being taken on line 6—6 of FIG. 7;

FIG. 7 is an end elevation of the housing at the expansion end and base receptacle section; and FIG. 8 shows a modification in the bearing assembly at the expansion end.

Figure 1:
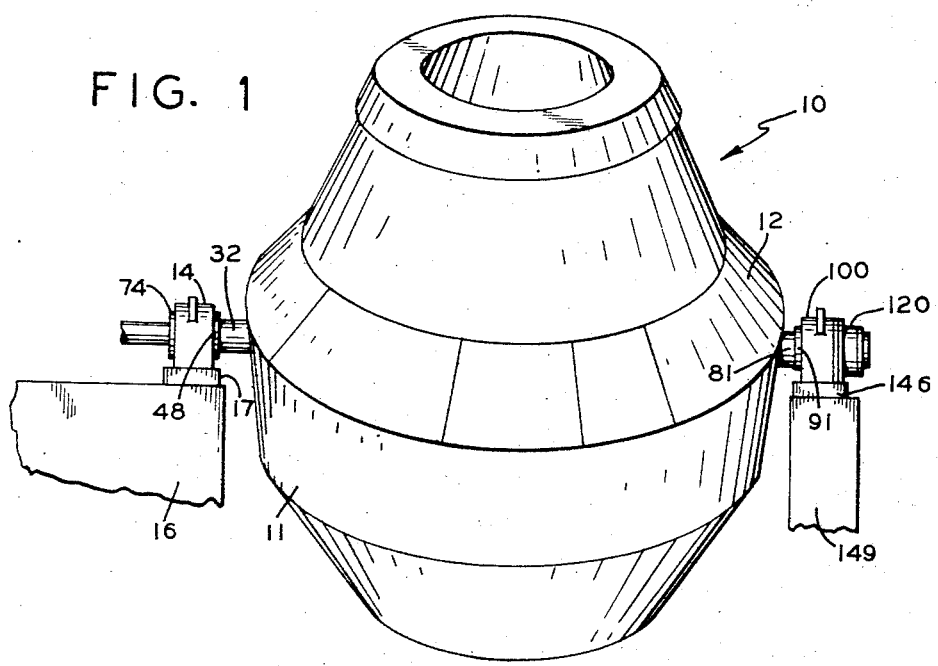
FIG. 1 is a side elevation of the assembly of the present invention with the upper end of the vessel tilted slightly towards the viewer.

There is shown in FIG. 1 the complete assembly, including a large vessel or shell 10 supported in a trunnion ring 11, and a slag skirt 12. Under this skirt are abutments which limit downward movement of the vessel within the ring. A bearing housing 14 at the fixed or drive end encloses the structural parts illustrated in FIG. 3. The aligned shafts supporting the shell could be driven from both ends but normally are not. This bearing housing is supported by a pedestal 16 having a base receptacle 17 to receive the base section 18 of the housing. This base receptacle is formed with a recess of rectangular shape extending downwardly from its upper face and which has a lower horizontal surface 19, opposed lateral walls 20 and opposed longitudinal walls 24, said walls being disposed at an angle of about 30° from the vertical.

The upper edge of the recess has a longitudinal dimension A and a lateral dimension B which are greater than the corresponding dimension A′ and B′ at the bottom of the recess. The relative steepness of the angle (30° +—) of the side walls of the recess effectively guide the base section to the bottom of the recess even if the vessel and bearing assembly are not in precisely the same place as they were when the bearings and bearing assemblies were lifted from the base receptacles. By bringing the base section back close to the precise area, it will rack itself into the recess as it moves down, the inclined walls acting as pilots to guide the base section downwardly.

A shaft 28 has a reduced section 29 at the drive end and a further reduced section 30 extending to the drive means (not shown). On the other side of central shaft section 28 is an enlarged section 32 forming a shoulder 34. At its inner end shaft section 32 is positioned in secured relation is an aperture in trunnion ring 11 by any suitable means which may include a key (not shown) for securing the parts against relative rotation. The main shaft section 28 carries the inner ring 36 of a bearing having spaced rows of spherical rollers 37. The inner ring has two annular recesses forming opposed shoulders 38 and 39 which can be engaged by opposite ends of the rollers. During normal running, the rollers should be guided by inside flanges 39 but during abnormal running conditions and during handling, they could touch the outside flanges 38. An outer ring 40 has a bearing surface 42 concave in cross section. To enable this bearing to cope with greater misalignment problems than usual, these rings have a greater width than would be considered standard in conventional roller bearings.

An inboard end wall 44 is formed integrally with the body of the housing and has an axial opening 46 which receives a sleeve 48 carried on shaft 28. One end of inner ring 36 abuts this sleeve and the other end of the sleeve abuts shoulder 34.

This end wall 44 is wider than would usually be provided since it takes the force required to rack or pilot the base section into the base receptacle. It has an opening 51 with a breather cap 52. The wall also has an annular recess 54 which receives a plate 56 which acts as a retainer for a seal 59 that floats up and down within a cavity 57. Alternatively, a cartridge seal may be used.

Another sleeve 58 abuts against the opposite side of inner ring 36 and this sleeve is engaged by a seal 59 held in a slot 60 in end cover 61 by a retaining ring 62. The end cover has an annular projection 64 which engages outer ring 40 and the cover is secured to the housing by bolts 67.

It will be noted that there is an annular cavity 68 between inboard end wall 44 and the inner ends of the bearing rings and grease is fed to the bearing through a port 65 at the upper end of the housing. An opening 69 leads from cavity 68 for the purpose of drainage. A similar annular cavity 70 at the other end of the bearing is closed by end cover 61. At its lower end, the housing has opposed lateral walls 72 and opposed longitudinal walls 73, all of which are inclined at the same angle as lateral walls 24 and longitudinal walls 20 of the recess in base receptacle 17 in which they are received.

Figure 3:
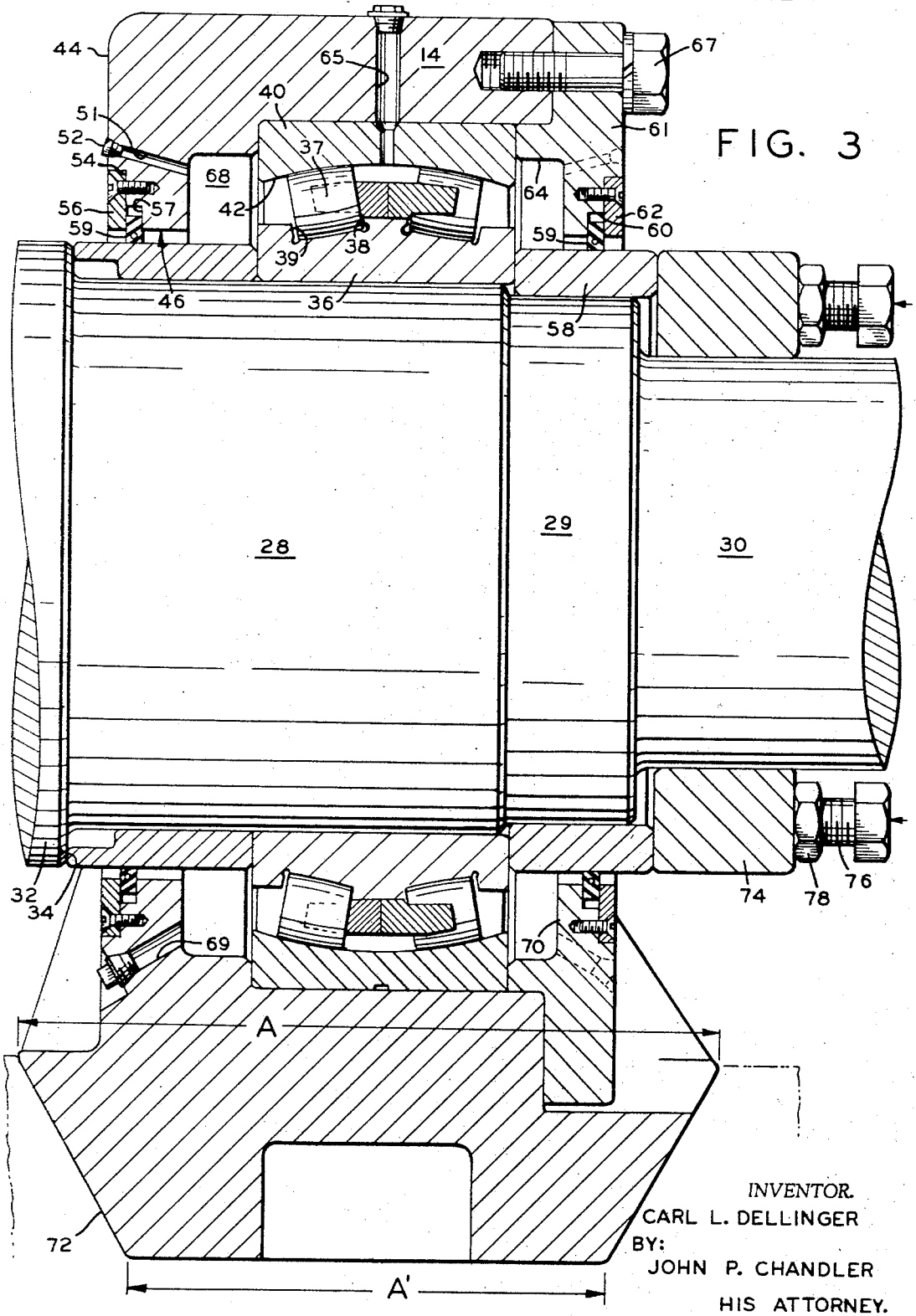
FIG. 3 is a central section taken through the bearing housing at the drive or fixed end.

A collar 74 is carried on smaller shaft section 30 and bolts 76 with locking nuts 78, carried by this collar are screwed inwardly or outwardly against the face (not shown) on a fixed ring on the drive assembly, thus holding all the assembled parts on shaft sections 28, 29 and 30, firmly against shaft shoulder 34, as indicated by the arrow in FIG. 3.

The shaft 80 at the expansion end has an enlarged section 81 forming a shoulder 82, the enlarged section being received in a hole in the opposite side of the trunnion ring. the shaft further has a reduced terminal section 84 forming a shoulder 86. The bearing includes an inner ring 88 carried on shaft 80, the ring having shoulders 89 which guide the opposite ends of sphered cylindrical rollers 90. The inner end of ring 88 engages a shaft shoulder sleeve 91 which in turn engages shaft shoulder 82. At its other end, the inner ring is engaged by a spacer sleeve 92 having an annular recess 94 forming a seat for a retainer ring 96 secured to shaft shoulder 86 by bolts 98.

The operative parts are enclosed in a housing 100 having an inboard end wall 101 with an annular groove 102 to receive a sliding seal 104. A retainer ring 106 keeps the seal in place. The bearing further includes an outer bearing ring 108 which has an inner surface 109 which is straight in cross section and engaged by the sphered rollers 90 which are retained in spaced relation by retainers 110. An outboard end cover 112 is positioned at the open end of the housing and on its outer surface there is an annular recess 114 which receives a flange 113 whose peripheral, eared section 116 is secured by bolts 118 to the end cover 112, said eared flanges being formed integrally with a cylindrical housing 120 for a spring cartridge, earlier mentioned.

The outer race 108 is received in secured relation in an annular recess 122 in the housing and at the inner end of the bearing assembly there is an annular cavity 124 and a breather opening 126 in the fixed inner end wall communicates with this cavity. Another annular cavity 128 at the opposite end of the rollers communicates with cavity 124 through a lubrication port 130. Lubricant is fed to both cavities through a port 134. End cover 112 has a recess 136 for a seal 138 and a retaining ring 140 keeps the seal in place.

Bearing housing 100 has a rectangular base section with opposed transverse walls 142 which are generally vertical, and opposed longitudinal walls 145 which are inclined at about the same angle as the base section in housing 14. This base section is received in a base receptacle 146 having a recess including a lower horizontal surface 143 opposed, inclined side walls 148, but no end walls. This base section is mounted on a pedestal 149.

The removable cartridge housing 120 at the right of bearing housing 100 forms the enclosure for the spring cartridge which includes two groups of Belleville type spring washers separated by an anti-friction arrangement including a rotating race or double direction thrust bearing plate 151 mounted on reduced shaft section 84. To the left side of the race, there is positioned a sleeve 152 having at one end an enlarged section forming a shoulder 154 and at the other end a reduced section 156 to clear a ball bearing assembly including a row of balls 158 in a retainer 159. A bearing ring 160 engages the balls on one side and the other side of this ring engages the first of a plurality of the spring washers 161. There are shown two pairs of such washers in opposed relation and a fifth washer 162 which engages an internal collar 164 formed integrally with housing 120.

To the right of thrust plate 159 is the identical assembly of balls 166, retainer 167, bearing ring 168, two pairs of spring washers 169 and a final washer 170, all mounted on a sleeve 171 having a reduced inner end section 172 and an enlarged outer end section forming a shoulder 174. The sleeve is secured to the end of shaft section 84 by tols 175. The housing has an end flange 176 secured in place by bolts 178 and having an internal shoulder 179 which engages terminal washer 170. A removable cover plate 180 has a plug 181 which can be removed to inspect the position of the spring washers of the cartridge. Lubricants are introduced through opening 182.

The self-centering and self-squaring spring arrangement just described assures that when the housing and bearing at the expansion end is lowered, the housing will be centered on the bearing at the middle of the expansion allowance. When it is so brought back, it is cool while at the time of removal it was presumably hot and the rollers will have shifted outwardly in the expansion allowance. If then, it is put down while still hot, in a different station for re-bricking, the vessel will contract and the rollers will move inwardly instead of outwardly. But before it drops down to this secondary re-bricking or re-lining station, the springs will have centered it.

The important consideration is that each time it is lowered into a station, the bearing is centered by the spring cartridge, and the built-in expansion allowance is greater than any expansion or contraction ever encountered. This eliminates a progressive expansion which could conceivably run out of space. So far as its self-squaring ability is concerned, if any misalignment is present, the parts may be cocked and the springs will square it up. When it comes down, the parts are initially aligned.

The self-centering and self-squaring spring arrangement of FIG. 6 is completely independent of the main bearing and can be installed at any time and it also has the advantage of being capable of being removed or replaced at any time so long as the bearing housing or block is sitting down, i.e., supported by the base receptable on the pedestal.

The sleeves 152 and 171 with bearing plate 151 between them could be carried directly at the end of shaft 80, thus eliminating the need for reduced shaft section 84. In the arrangement shown, the sleeves become, in effect, integral with the shaft due to the bolting and clamping arrangement. Also, the bearings 158–166 on both sides of plate 151 could be eliminated and the spring washers 161 and 169 directly contact plate 151 without too great a loss of anti-friction qualities.

The parts in the spring cartridge are so proportioned that at a mean or ambient temperature the stack of spring washers on each side of the double direction thrust bearing plate 151 are under a slight pre-load and the sphered rollers are in the center of the outer bearing ring and are, therefore, centered with respect to the positive and negative expansion allowances. If the entire assembly shown in FIG. 6 is subjected to neither undue heat nor cold, and is raised from its base receptacle 146 and then lowered back into place, it will return to precisely the same position therein as it previously occupied.

During the time it is subjected to the high heat, during normal steel making operations, the expansion of the shaft will have moved rollers 90 into the positive expansion area (at the right) and spring stack 169–170 at the right will be put under compression and the preload of the springs to the left is reduced but the terminal spring washer 162 will rarely lose contact with collar 164 unless expansion is so great that movement of shoulder 154 causes this separation, in which case the spring stack at the left side simply rotates with the shaft. The spring pressure is selected so that during expansion very little axial force is required to compress one of the stacks. This spring force plus the low internal axial sliding friction of the cylindrical roller bearing is much less than the sliding frictional force of the expansion housing axially in its base receptacle.

The modified spring cartridge arrangement of FIG. 8 can also be added on at any time but since it is disposed internally of the shaft, the end cover and clamping assembly must be removed for installation. This arrangement is self-centering, sel-aligning and the expansion allowance is axially adjustable, which is desirable in the event that it is discovered that more allowance, either positive or negative, is required.

This internal and self-contained unit is positioned in axial bore 186 at the outer end of shaft section 188 which corresponds generally to shaft section 80 of FIG. 6. The inner bearing ring 189, the sphered rollers 190, the long, straight, inner surface 191 of the outer race 187, the sleeve 192 contacted by the inner ring at one end and engaging the shaft shoulder 193, at the other end, are substantially the same, just as is the housing 194, and annular seat 195 for the outer ring. The clearance 197 between sleeve 192 and the fixed end wall of housing 194 is selected so as to restrict the angular movement of the housing and outer ring 187 with respect to the rollers 190 and inner ring 189 to a degree that is less than the tolerable misalignment angle of this special cylindrical roller bearing, thereby preventing edge loading of the rollers.

The outer ring is held in place by an annular flange 196 of an end cover 198 secured to the housing by bolts 199. The inner ring 189 is secured in place by a retaining ring 200 secured by bolts 201 to the end of shaft 188.

The spring cartridge assembly includes a two-part outer sleeve, and a two-part inner sleeve with a self-aligning bearing therebetween, the latter being mounted on a shaft 202 with a reduced threaded section 204 at its inner end and a threaded section 205 of larger diameter adjacent its outer end, each threaded section carrying a pair of nuts 206 for axial adjustment. Inner sleeve section 207 is concentric with outer sleeve section 208, which latter has a flange 209 at its inner end. The axial bore 186 in the main shaft has a short chamfered section 210 leading to reduced section 211 and this leads to a further reduced axial bore 212. A flat ring 214 is seated against a shoulder 215 at the inner end of bore 186 and this ring is engaged by the first or innermost one 216 of six spring washers arranged in opposed relation forming a single spring stack. The outermost spring 218 engages a flat ring 219 secured in place by flange 226 on second outer sleeve section 224. These spring washers and the flat ring 219 have lubrication openings 217.

Sleeve 208 has an enlarged internal bore forming a shoulder 221 against which one end of the outer race 222 of a self-aligning bearing is seated.

The second inner sleeve section 220 has an enlarged bore 223 at its outer end to provide clearance for enlarged thread section 205 of shaft 202. This sleeve section carries the inner ring 225 of said bearing and an enlarged section 227 of sleeve 220 forms a shoulder which engages one end of inner ring 225, the other end abutting first inner sleeve section 207.

The outer end of shaft 202 has an enlarged section 231 and a slightly reduced section 232 which carries the inner ring 234 of a self-aligning bearing whose outer ring is received in a seat 236, in end cover 198 of the housing. The inner bearing ring is secured by a ring 238 held against outermost shaft section 231 by a screw 240. A cap 242 covers the outer end of this assembly. The end cover also has a breather opening 244 and a lubrication drainage opening 246. Lubrication is fed through a port 248 at the top of housing 194.

At a normal or mean temperature, the sphered rollers 190 are centered with respect to the outer ring 187 of the main bearing. Plate 214 is seated against shaft shoulder 215 and plate 49 is seated against ring 200. The two plates are confined by the flanges 209 and 226 of the outer two-part sleeve and the spring washers 216–127 are under some preload between plates 214 and 219.

When the assembly is subjected to interim heat through normal use the main shaft expands axially and rollers 190 move into the positive expansion area and the shaft shoulder 215 moves against plate 214 which move plate 214 away from flange 209 which is always fixed. It further causes ring 200 to move to the right, away from plate 219, which can't move because it is confined by flange 226 which is always fixed. The springs are now under controlled compression.

Under extreme cold, the opposite condition occurs. The main shaft contracts, leaving a gap between shaft shoulder 215 and plate 214. The plate can't move to the left because it is confined by flange 209. This contraction also causes ring 200 to move to the left, leaving a gap between plate 219 and flange 226. The rollers 190 are over in the negative expansion area.

It will be apparent that with this arrangement, just as in the arrangement of FIG. 6, the main bearing becomes automatically centered when the housing is lifted from its base receptacle, regardless of whether the main shaft was under expansion or contraction. Also, in both arrangements the springs are so connected that no rubbing or sliding will occur in the spring assembly connecting the rotating main shaft with the stationary housing.

In connection with the structures of both FIGS. 6 and 8, it may also be noted that it is possible to substitute a conventional self-aligning spherical roller bearing which would slide in the expansion end housing or in an insert having special frictional characters within this housing instead of having the relative axial movement take place within the specially crowned cylindrical roller bearing.

The specially crowned bearing 90 of FIG. 6 and 190 of FIG. 8 are known in the art and are described in detail in "FAG Roller Bearings for Converts," Publication No. 17 101 E, FAG Kugelfischer George Schafer & Co., Schweinfurt, Germany. These specially crowned cylindrical roller bearings are capable of taking expansion and also angular misalignment, far in excess, of what is normal for a conventional cylindrical roller bearing.

Figure 2:
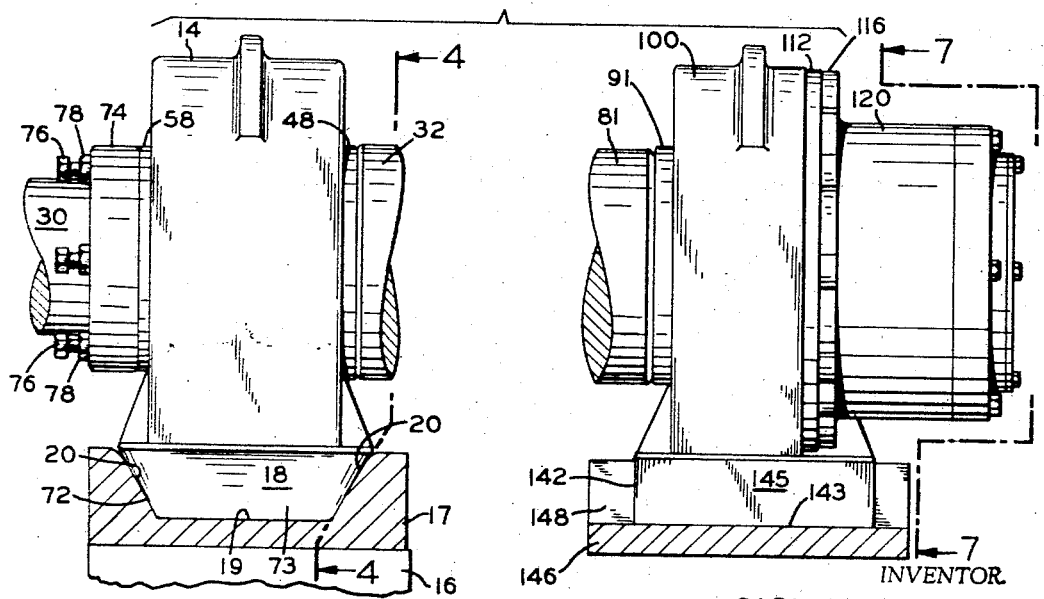
FIG. 2 is a side elevation of the two bearing housings and showing a vertical section through the recesses in the base receptacle and the solid base sections of the bearing housings received therein.

No specific relationship between the depth of recess 18 in the base receptacle 17 (FIG. 2) and the inclination of the side walls 20 can be staed except to note that the relationship of the depth of this recess, together with the angular inclination of the inclined walls should be preselected to accommodate the maximum axial, transverse, and angular out-of-location position of bearing housing 14 that can be anticipated when the complete vessel assembly is brought over the base receptacles for lowering into its operating position. Similarly, the depth and angularity of the base receptacle 146 at the expansion end is preselected to accommodate the maximum transverse and angular out-of-location of the expansion end housing 100 after the fixed end housing has seated itself into position. It is quite important that the latter end be seated first.

The clearance 197 between the end wall of housing 194 and the main shaft should be of such dimension as to restrict the free state misalignment to a value within the tolerable limits of the bearings in both housings.

It should also be noted that preloaded spring washers are employed and selected to utilize their unique load compression characteristics so that after the expansion load necessary to overcome initial axial compression has been applied, very little, if any, additional load is required to produce additional spring compression.

Also, the spring pressure, when the spring has been compressed from its central position, is greater than the internal sliding friction resistance of the main expansion end bearing and housing when hung freely. The combination of the maximum compressed spring pressure plus the maximum sliding friction resistance of the main expansion end bearing under vessel load is less than the axial sliding friction of the expansion end housing 100 in its base receptacle 146.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claims are intended to be included therein.

The embodiments of the invention in which an exclusive property or privilege is claimed are defined as follows:

1. A bearing assembly for a steel making vessel supported in a trunnion ring with aligned main shafts extending from opposite sides of the ring, a main bearing in which the shaft is journalled at both a fixed end and at an expansion end of the assembly, inner and outer rings in each bearing, and rollers between the rings, a housing enclosing each main bearing, a pedestal with a base receptacle having a recess extending downwardly from its top, supporting each housing, the recess in the base receptacle at the fixed end being of rectangular shape and provided with pairs of opposed, inclined walls extending axially and transversely thereof, the housing having a base section with matching inclined walls, to cause said housing, when raised from and later returned to the base receptacle, to be returned in its initial position, the recess in the receptacle in the expansion end provided with a pair of opposed, inclined walls extending axially thereof, the housing having a base section with matching inclined walls to cause said housing, when so returned to return itself to its initial position transversely of the recess.

2. The structure defined in claim 1 wherein said inclined walls of the base receptacles and base sections are disposed at an angle of about 30° from the vertical.

3. The structure defined in claim 1 wherein the fixed end of the bearing is the drive end.

4. The structure defined in claim 1 wherein the main bearings at the fixed end is a spherical roller bearing and at the expansion end is a cylindrical roller bearing.

5. The structure defined in claim 1 wherein the relationship of the depth of the recess in the wall base receptacle at said fixed end, together with the angular inclination of the inclined walls have been preselected to accommodate the maximum axial, transverse, and angular out-of-location position of the bearing housing that can be anticipated when the complete vessel assembly is brought over the base receptacle for lowering into its operating position, and the depth and angularity of the base receptacle at the expansion end is preselected to accommodate the maximum transverse and angular out-of-location of the expansion end housing after the fixed end housing has seated itself into position.

6. The structure defined in claim 5 wherein there is a clearance between the housing end wall and the main shaft and said clearance is of dimension as to restrict the free state misalignment to a value within the tolerable limits of the bearings in both housings.

7. The structure defined in claim 4 wherein the outer ring of the latter bearing is longer than the cylindrical rollers to provide expansion areas into which the rollers may move when the main shafts expand or contract axially.

8. The structure defined in claim 1 wherein a spring arrangement is provided at the expansion end for automatically centering the bearing.

9. The structure as defined in claim 8 wherein preloaded spring washers are employed and selected to utilize their unique load compression characteristics so that after the expansion load to overcome initial axial compression has been applied, very little additional load is required to produce additional spring compression.

10. The structure defined in claim 8 wherein spring pressure when the spring has been compressed from its central position is greater than the internal sliding friction resistance of the main expansion end bearing and housing when hung freely, and the combination of the maximum compressed spring pressure plus the maximum sliding friction resistance of the main expansion end bearing under vessel load is less than the axial sliding friction of the expansion end housing in its base receptacle.

11. The structure of claim 6 wherein said spring arrangement includes a self-contained spring cartridge into which the shaft extends and including a housing mounted in fixed relation on the bearing housing and provided with spaced internal collars forming stops, sleeves carried on said shaft with a thrust bearing plate therebetween, a spring stack comprising springs in opposed relation carried on each sleeve between said plate and each of said stops, and bearings between one end of each stack and the bearing plate, whereby expansion or contraction of the shaft places one of said stacks under compression and automatically centers the bearing at the expansion end when the expansion end housing is lifted from its base receptacle.

12. The structure of claim 6 wherein said spring arrangement includes a self-contained spring cartridge into which one end section of the shaft extends, a double thrust bearing plate secured on said end section against axial travel, a housing mounted in fixed relation on the bearing housing and provided with spaced internal stops, a stack of spring washers in opposed relation carried concentrically of the shaft between said plate and each of said stops, whereby expansion or contraction of the shaft places one of said stacks under compression and automatically centers the bearing at the expansion end when the expansion end housing is lifted from its base receptacle.

13. The structure of claim 6 wherein said spring arrangement is self-squaring and includes a self-contained spring cartridge into which an end of the main shaft passes, said cartridge including a housing mounted in fixed relation on the bearing housing, a stop at each end of said housing, a thrust bearing plate secured against axial movement spaced from the end of the shaft, a stack of spring washers in opposed relation carried on the shaft between each stop and said thrust bearing plate and antifriction bearings between each stack and said plate, whereby expansion or contraction of the shaft places one of said stacks under compression and automatically centers the bearing at the expansion end when the expansion end housing is lifted from its base receptacle.

14. The structure of claim 6 wherein said spring arrangement is disposed in an axial bore in the main shaft and comprises a fixed shaft extending into said bore and supported by the bearing housing, the main shaft having a counterbore leaving a shoulder at the inner end of the axial bore, a self-aligning bearing between said fixed shaft and the housing, two part inner and outer sleeves with a self-aligning bearing therebetween carried on said fixed shaft, the outer sleeve having flanges at each end, plates at the inner and outer ends of said sleeve slidable thereon but confined on the sleeve by the flanges and spring washers on the sleeve between said plates, a ring fast on the main shaft end engaging the outer plate while said shoulder formed by the counterbore engages the inner plate, whereby expansion of the main shaft causes the outer plate to move away from the ring and contraction causes the inner plate to move away from said main shaft shoulder, either of which puts the spring stack under compression.

15. The structure of claim 14 wherein means are provided for effecting axial adjustment of said fixed shaft.

16. The structure of claim 6 wherein said spring arrangement is disposed in an axial bore in the main shaft and comprises a fixed shaft extending into said bore and supported by the bearing housing, a self-aligning bearing between said shaft and the housing, an inner sleeve carried on said shaft, an outer sleeve concentric therewith and a self-aligning bearing between the sleeves, the outer sleeve having flanges at its ends, plates slidable on the sleeve engaged by said flanges, a plurality of spring washers in opposed relation between said plates, a retaining ring at the outer end of the main shaft, whereby the stack will be compressed under axial expansion or contraction of the main shaft and automatically center the bearing at the expansion end when the expansion end housing is lifted from its base receptacle.

References Cited

UNITED STATES PATENTS 3,291,541    12/1966    Dellinger      308—6

MARTIN P. SCHWADRON, *Primary Examiner.*

FRANK SUSKO, *Assistant Examiner.*

U.S. Cl. X.R.

308—189.